US008095339B2

(12) United States Patent  (10) Patent No.: US 8,095,339 B2
Delory  (45) Date of Patent: Jan. 10, 2012

(54) INTEGRATED PORTABLE ELECTRONICS TESTER

(76) Inventor: Paul Delory, Malden, MA (US)

(*) Notice: Subject to any disclaimer, the term of this patent is extended or adjusted under 35 U.S.C. 154(b) by 693 days.

(21) Appl. No.: 12/080,915

(22) Filed: Apr. 7, 2008

(65) Prior Publication Data

US 2008/0270079 A1  Oct. 30, 2008

Related U.S. Application Data

(63) Continuation-in-part of application No. 11/513,622, filed on Aug. 31, 2006, now Pat. No. 7,376,537.

(51) Int. Cl.
*G06F 11/30* (2006.01)
(52) U.S. Cl. .................................................. 702/186
(58) Field of Classification Search .................. 702/186, 702/121; 713/1; 361/679.46
See application file for complete search history.

(56) References Cited

U.S. PATENT DOCUMENTS

| 4,837,764 A | 6/1989 | Russel |
| 5,119,497 A * | 6/1992 | Freige et al. ............. 361/679.46 |
| 5,357,519 A | 10/1994 | Martin et al. |
| 5,692,189 A * | 11/1997 | Lipe ................................... 713/1 |
| 5,991,805 A | 11/1999 | Krukovsky |
| 6,775,192 B2 | 8/2004 | Harrington et al. |
| 2006/0085158 A1 * | 4/2006 | Cakiner ....................... 702/121 |

* cited by examiner

*Primary Examiner* — Drew A Dunn
*Assistant Examiner* — Xiuquin Sun
(74) *Attorney, Agent, or Firm* — Lambert & Associates; Gary E. Lambert; David J. Connaughton, Jr.

(57) ABSTRACT

A device and method for testing the functionality of various electronic device components. The device is portable and is capable of being upgraded with changes in technology. The device is enclosed within a housing, which may include a power supply and a display. The disclosed device incorporates a tester for personal computer and laptop components, including but not limited to, power supply, microprocessor, motherboard, system memory, video subsystem, mass storage devices, and cables.

10 Claims, 8 Drawing Sheets

FIG. 8

INTEGRATED PORTABLE ELECTRONICS TESTER

CROSS REFERENCE TO RELATED APPLICATION

This application is a continuation-in-part of prior U.S. application Ser. No. 11/513,622 filed on Aug. 31, 2006, currently issued as U.S. Pat. No. 7,376,537 issued on May 20, 2008, the contents of which are incorporated herein by reference.

BACKGROUND OF THE INVENTION

1. Field of Invention

The invention relates generally to the field of testing the condition of a computer or laptop and the components and/or peripherals thereof and includes an apparatus and method for achieving testing.

2. Description of the Related Art

Diagnosis of a faulty computer system can be a difficult process. The computer service technician is charged with identifying all the faults in a given system in quick and accurate fashion. Prior to the advent of the instant invention, the methods a technician may utilize to accomplish this task qualify as unsatisfactory. Presently, one method entails trial and error, replacing the various components of a PC with components that are known to work properly. This constitutes a cumbersome and time-consuming process that requires the technician to continually have on hand an inventory of tools and known-good parts.

Another method is to use a variety of computer testing tools, which are known in the art, to test all the various components/peripherals of the PC. Once again, to accomplish testing and repair in this manner, the technician must have on-hand a large inventory of tools, each designed to test a single PC component. Further, the technician must once again possess an inventory of known-good parts to replicate the function of components he finds to be faulty.

These methods become even more unsatisfactory when one considers how quickly technology changes. In order to stay abreast of the frequent and substantial changes in computing technology, the technician must always be purchasing new tools designed to test the functionality of such new devices and standards as are developed. Moreover, when these new devices and standards are developed, their adoption is never immediate, meaning that a technician will always be required to service a mix of old and new technologies. Thus, he does not simply discard his old tools in favor of the new, but rather adds the new tools to the old.

The result of these practices is a toolbox that is ever larger, ever more unwieldy, and ever more expensive. Of higher import, if a technician requires a large number of tools in his daily business, he must be proficient in the use of a large number of tools. As well, the technician must understand how to operate each of the tools in his kit, how they relate to one another, and how to interpret the various and extensive results and/or outputs of the tests. In short, there is a burden placed upon the technician to coordinate and understand the large and diverse number of data with which he is regularly presented.

Furthermore, the hardware diagnostic tools presently available and known in the art make no provision for the testing of a computer's software configuration. This constitutes a glaring weakness, since as present day computers evolve; the software configuration is at least as important to proper operation as the hardware. A service technician cannot be said to have made a complete diagnosis unless he has also tested a computer's software. (This is particularly true in light of the current epidemic of viruses and spyware; at present, nearly every Windows-based machine the service technician encounters will be infested with some form of "malware.") Additionally, the service technician will frequently need to retrieve data stored on a malfunctioning computer, and no tool presently available makes any provision for such data retrieval due to the design of present systems.

A large number of diagnostic tools for individual PC components are known to the art, and in fact are in wide use in the industry. But there exists in the art no portable, universal, completely modular, expandable, and upgradeable device that integrates into one package all the tools a field service technician needs, tests each PC component in its native operating environment, replicates the function of faulty PC components, provides for the testing of a PC's software condition, and allows for the retrieval of data from a malfunctioning PC.

Furthermore, there are additional challenges when repairing a laptop PC, over and beyond those described above, because of the lack of standardization in mobile computing. Desktop PCs conform to rigid and detailed universal specifications, which are set by industry groups and therefore utilized industry-wide. Laptop PCs, however, have far fewer such standards. Individual manufacturers engineer their own components to their own specifications, and therefore there is a vast assortment of different components in use in the industry. Components vary wildly between different manufacturers, between different models produced by the same manufacturer, and even between different machines of the same make and model. The service technician, of course, is charged with repairing all of these machines, regardless of the differences in components. Therefore, he must have tools capable of diagnosing and repairing this large and sometimes baffling array of components.

The Portable Electronic Tester disclosed in U.S. patent application Ser. No. 11/513,662 to Delory, and incorporated herein by reference, while an important step in this direction, has only limited functionality for laptops. The desktop unit is designed to work with industry-standardized technologies, only those laptop components that are standardized can be diagnosed by the desktop unit. While the apparatus is capable of testing laptop hard drives, and the continuity of many important cables used in laptops. But it is incapable of diagnosing laptop power supplies, processors, memory, video output, or video display panels, as these components, which are standardized on desktop PCs, have no equivalent uniformity on laptops. There is a clear need, then, for a test device that is capable of diagnosing and repairing the diverse and sundry components it will encounter in the mobile computing environment.

But any solution will introduce a different problem. Because of this proliferation of different connector types for laptop components, the only practicable solutions will involve an assortment of adapters designed to interface the tool with the all the various connector types the tool's user will inevitably encounter in the field. With any collection of adapters, however, there is always the risk that adapters will be lost or broken, rendering the tool useless. Therefore, the device must also take measures to eliminate the risk of loss or breakage of these all-important adapters.

U.S. Pat. No. 5,991,805, issued to Krukovsky in 1999, discloses a tester for computer audio and video that is both portable and universal. But this device, while an obvious improvement to other testers known in the art, is limited in scope to the testing of video and audio. In a field service environment, it would be just one more tool in the service technician's kit, rather than an integrated diagnostic solution.

U.S. Pat. No. 6,775,192, issued to Harrington et al. in 2004, discloses a DRDRAM chip tester, which differs from other DRDRAM testers known to the art in that it can test a memory chip in a reduced power state. But this device requires the memory chips to be inserted in the device's test banks. In a field service environment, the end user would be obliged to remove the chips from the computer under test and place them in the device. This is an obvious inconvenience. But, far more importantly, this device tests only the memory chips themselves. In a field service environment, the service technician requires a memory test that tests the entire memory subsystem. It is imperative, therefore, that the field service technician test memory chips in their native operating environment—a test the Harrington device cannot conduct.

U.S. Pat. No. 4,837,764, issued to Russello in 1989, discloses "an apparatus and method for testing the condition of computer peripherals." This device, however, is limited in scope to the testing of computer peripherals such as printers and modems: It makes no provision for the testing of internal PC components. This device is not portable. This device makes no provision for upgrading to new technologies—and indeed, the technologies around which this device is built are now obsolete, meaning that this device would not function with any PC peripheral sold today. Furthermore, the Russello device relies upon a series of diagnostic cards, which cards need to be written with diagnostic routines suitable for each individual peripheral under test. This solution is impracticable: To have on hand a diagnostic card appropriate for every peripheral type known in the art would be not just unnecessarily cumbersome, but virtually impossible.

U.S. Pat. No. 5,357,519, issued to Martin in 1994, discloses "a device and method for diagnosing a faulty computer system without disassembling the system." These "nonintrusive diagnostics of a computer system" allow the end user to connect the Martin device to the externally accessible ports of a malfunctioning PC, whereupon the device will execute a series of test routines, and report back to the end user any errors in the PC's hardware it finds. Since PCs are built in many different configurations, the device operates via a series of removable ROM packs and port packs: The user inserts the appropriate ROM pack, which contains the appropriate test routines for the particular PC under test, and the appropriate port pack, which replicates the port configuration on the particular PC under test. Thus, the Martin device allows an end user with little training to diagnose PC problems accurately, without ever needing to access the interior of the PC under test.

As with the Russello device, the Martin device relies upon a series of removable ROM packs and port packs, requiring the end user to have on hand two accessory packs for each computer to be tested; if these packs are not present, the device cannot function. These packs are cumbersome, and they call into question the Martin device's claim to portability: Although the device itself may be portable, the end user must also carry a potentially very large number of ROM and port packs. Furthermore, the Martin device makes no provision for replicating a malfunctioning PC's faulty components. While it uses its own components to compensate for the missing functionality of faulty components, it runs its own software-based test routines, rather than enabling the PC under test to load into its normal operating environment. Thus, the end user cannot assess the condition of a PC's software configuration, nor can he retrieve data from a malfunctioning PC, using the Martin device.

Most importantly, however, the Martin device's diagnostic method is irreparably obsolete: It simply would not function with today's technology. Many of its diagnostic subroutines rely upon accessing the Test Manager diagnostic program stored in the boot ROMs of the Macintosh computers of this device's era. But Macintosh computers no longer make use of boot ROMs, and Windows-platform PCs never did. The Martin device would not function on any PC manufactured today. Moreover, even when the Macintosh's boot ROM system was state-of-the-art, this device could make no claim to universality: The Macintosh never enjoyed much market support; this device would function on, at best, one machine in ten. A computer testing device that cannot test Windows-based PCs isn't of much practical value.

In summary, investigation of these disclosed devices illustrates that presently, there is no single device known in the art that meets the requirements of a field service technician as nothing in the prior art discloses a portable integrated tester which allows the user to check a variety of component and functionality.

SUMMARY OF THE INVENTION

The instant invention, as illustrated herein, is clearly not anticipated, rendered obvious, or even present in any of the prior art mechanisms, either alone or in any combination thereof.

The primary object of the present invention is to provide a single, portable device useful for computer and laptop diagnostics and repair, which device integrates into one package all the tools a field service technician needs in his daily business.

Another object of the present invention is to provide a diagnostic device that can be upgraded to accommodate such new technology as will inevitably be developed, while still remaining useful for older and legacy technologies.

Another object of the present invention is to provide a diagnostic device that can also replicate the functions of faulty PC and laptop components, allowing the PC or laptop under test to be operated normally, and in its native operating environment, so that all components can be tested in-environment, and under their normal operating conditions.

Another object of the present invention is to provide a device that enables the service technician to test a PC or laptop's software configuration, and to retrieve data stored on a PC, even when that PC cannot do so itself due to some malfunction.

Another object of the present invention is to provide a method for the diagnosing and repairing of a computer or laptop that requires no system-specific knowledge on the part of the end user, and relatively little general repair knowledge.

There has thus been outlined, rather broadly, the more important features of the portable electronics tester in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

DETAILED DESCRIPTION OF THE INVENTION

The instant invention, which, in its integrated form may be deemed the "TechMate," comprises an apparatus and methods for (1) testing the condition of computer components and/or peripherals; (2) diagnosing specific problems with those components and/or peripherals; (3) providing electrical power to computers that cannot power themselves due to some malfunction; (4) replicating the function of malfunctioning PC components, so that testing can proceed unhindered; and (5) retrieving user data from computers when they cannot do so themselves due to some malfunction. The apparatus is universal, portable, completely modular, expandable, and upgradeable for new technology.

The instant invention may be contained in a separate housing or integrated into the same chassis with a laptop computer. However the device is accommodated, it will consist of a main control panel controlling and coordinating a series of modules designed to test all the relevant functions of a PC's components and peripherals.

Figure 1:
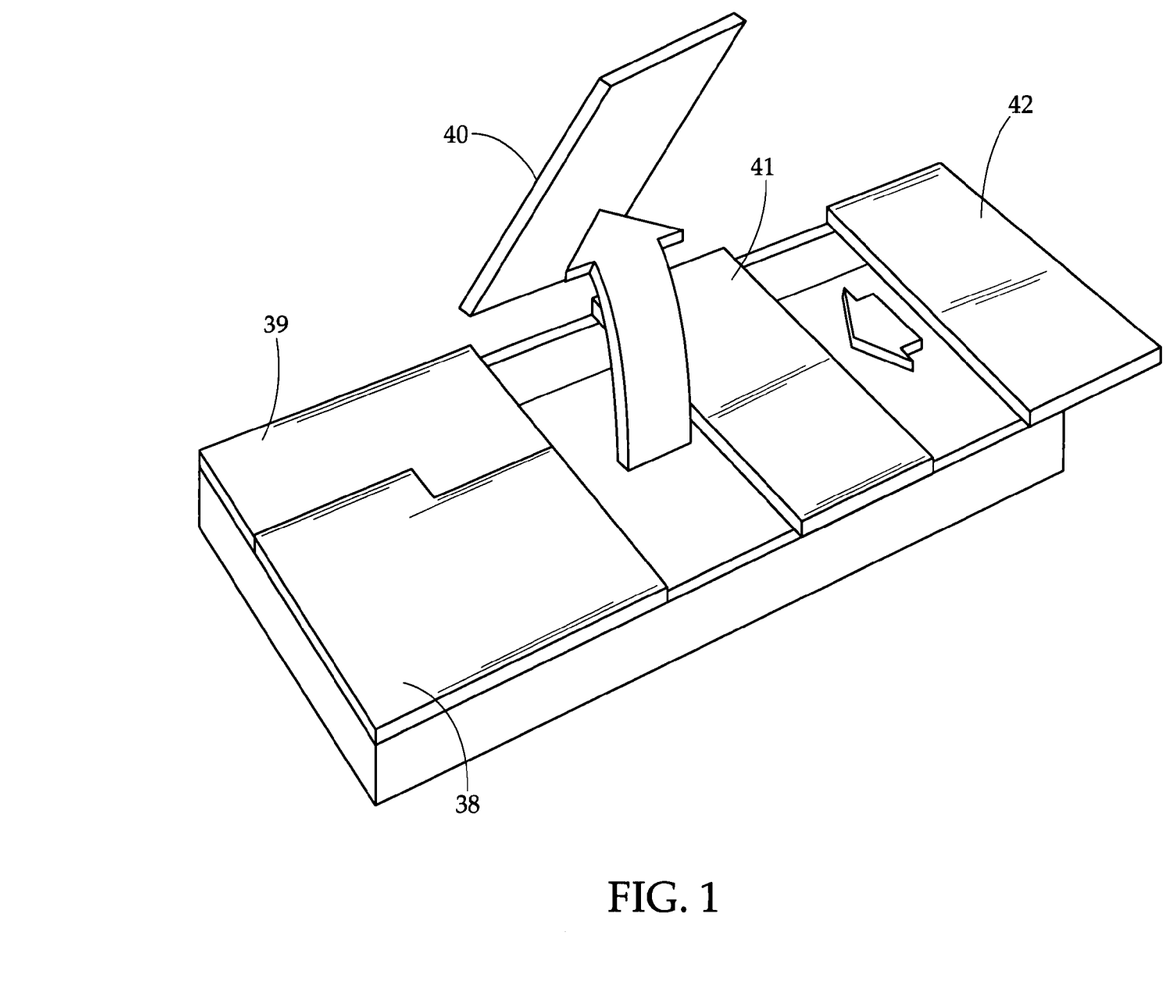
FIG. 1 is an isometric view of the instant invention, illustrating an overview of the location of the Main Control Panel and the Four Removable Modules.
Figure 2:
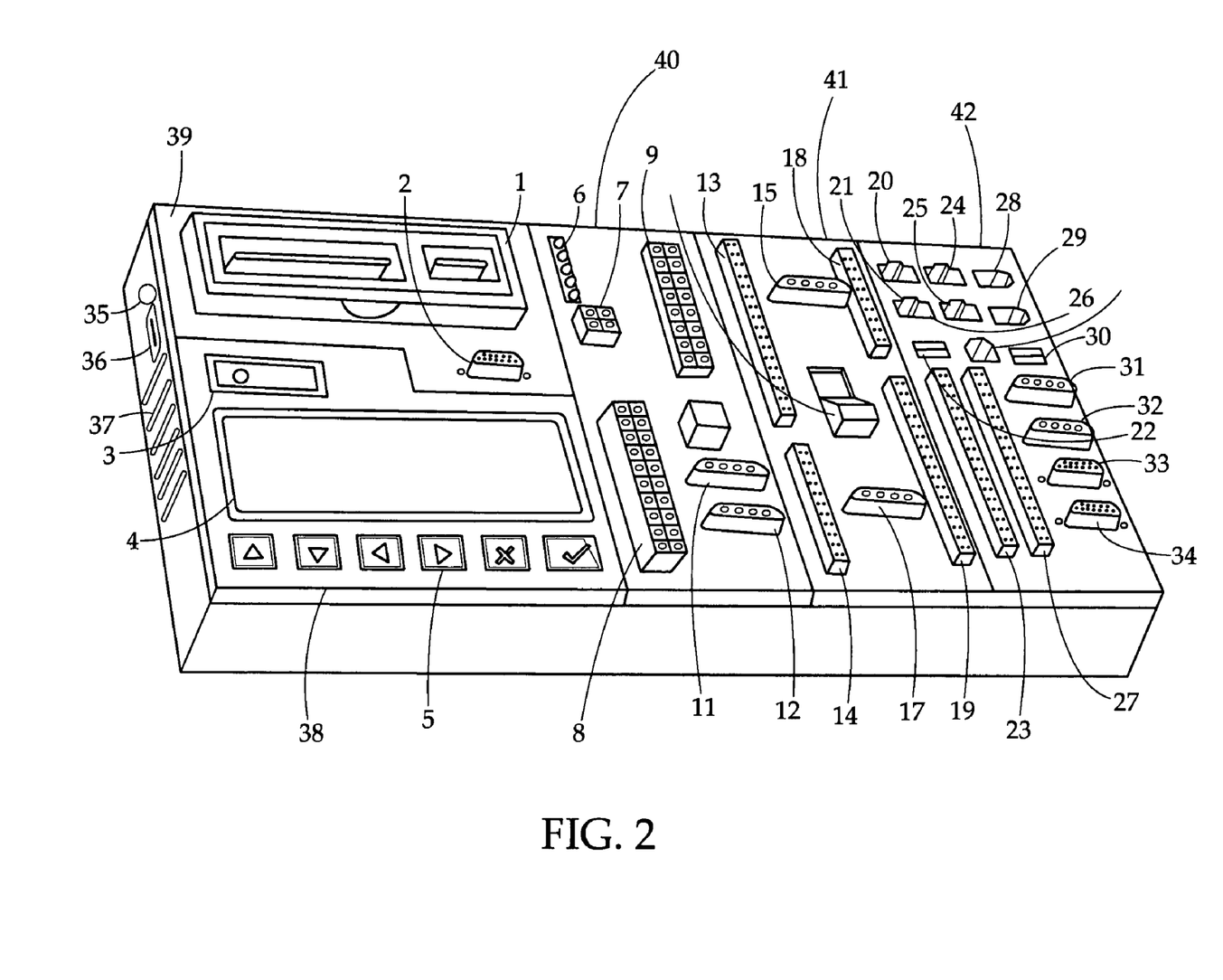
FIG. 2 is an isometric view of the instant invention, further illustrating the components of the Main Control Panel and the Four Removable Modules.
Figure 3:
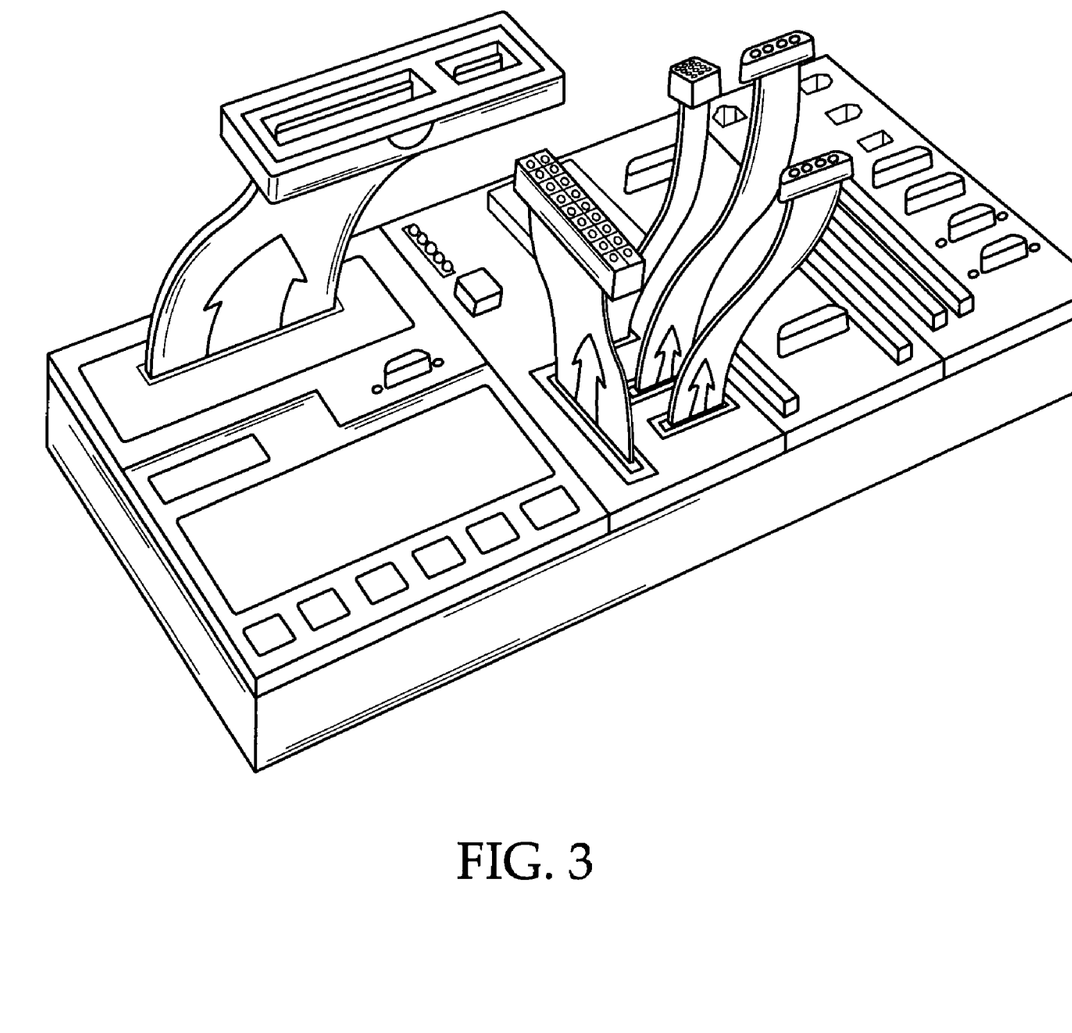
FIG. 3 is an isometric view of the instant invention, further illustrating the PC's PCI bus; inputs for a standard ATX/BTX Molex connector; the third DC power output with a standard ATX/BTX peripheral power output connector; preferably featuring a retractable cable; and, a fourth DC power output with a SATA peripheral power connector; preferably featuring a retractable cable.
Figure 4:
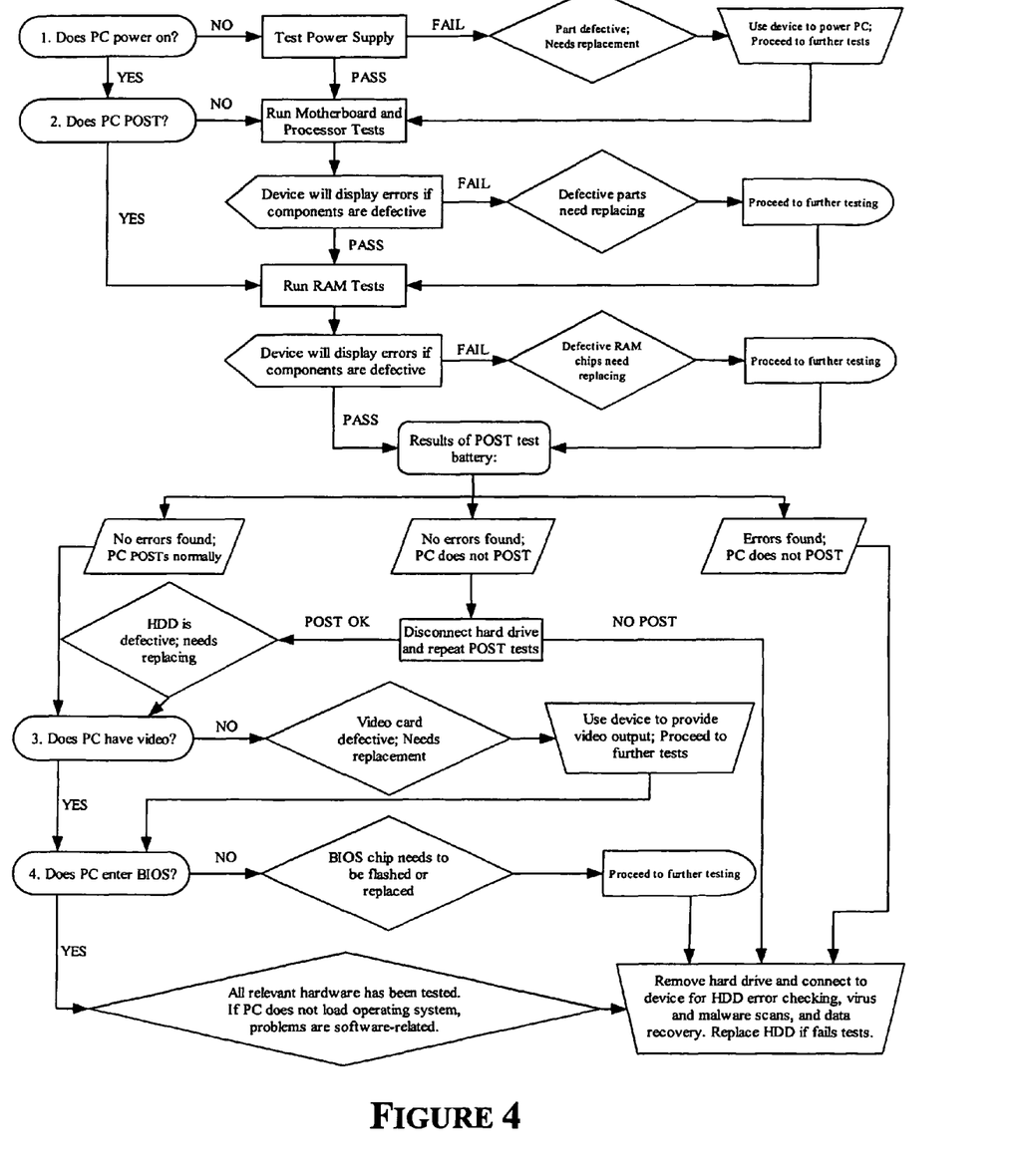
FIG. 4 is a flow chart of the method.

Taking into account the present state of the art, the current embodiment of the TechMate will feature four removable modules 39-42, as shown in FIGS. 1-3. These respective modules include a module for testing a malfunctioning personal computer's power supply 40; a module for personal computer's mass storage devices 41; a module for testing a personal computer's cable continuity 42; and a module for testing a personal computer's 39 POST, RAM, and video. Again, this is only the current embodiment, since as technology changes these modules can be replaced with modules designed to test whatever new technology is developed. There can even be more or fewer modules depending upon the needs of the technology.

The TechMate Main Control Panel 38 is the main user interface for the device, and controls and coordinates the individual test modules. It consists of a master power switch 3; a means of communicating with the end user, preferably an LCD screen 4; a means of receiving user input and commands, preferably a series of cursor controls 5; a microprocessor; and one or more nonvolatile memory means for storing commands and operating instructions.

The Power Supply Test Module 39 is designed to provide complete testing of a PC's power supply, as well as to provide power to a PC whose power supply has malfunctioned. It will consist of a DC power supply comprising a rectifier and AC to DC converter, which supply is capable of producing electrical power sufficient to enable not only the module's own operation, but to provide power to a malfunctioning PC; a simple ATX/BTX power supply tester with inputs for both a standard ATX/BTX Molex connector 9 and a Pentium IV auxiliary power connector 7; a panel of LEDs to indicate a power supply's condition 6; a first DC power output with a standard ATX/BTX Molex connector, preferably featuring a retractable cable 8; a second DC power output with a Pentium IV auxiliary power connector, preferably featuring a retractable cable 10; a third DC power output with a standard ATX/BTX peripheral power output connector, preferably featuring a retractable cable 12; and a fourth DC power output with a SATA peripheral power connector, preferably featuring a retractable cable 11.

Of course, it will be obvious to one skilled in the art that this module can be redesigned in future to accommodate changes in power supply technology and thus, as the ATX-style connectors that are the current state of the art become obsolete and are replaced with newer standards, new modules can be easily designed that will allow the device to test and power devices built to those newer standards.

When the technician engages a PC that cannot power on, the end user will begin his diagnostic procedure by testing the PC's power supply. He will connect the power supply's Molex connector to the ATX/BTX Molex Power Connector Test Input Port 9. If the PC to be tested has a Pentium IV processor, he will also connect the power supply's auxiliary power connector to the Pentium IV Auxiliary Power Connector Test Input Port 7; otherwise, this port will not be used. The condition of the power supply will be indicated on the Power Supply Tester Indicator LEDs 6 as follows: if all of these LEDs light up, the power supply functions to specifications; if one or more fail to light, the power supply is defective and needs replacement.

If, by means of this test, the end user determines that the power supply is defective, he can then use the device as a surrogate power supply, in order to power the PC for further testing. To achieve this, the user unspools the ATX/BTX Molex Power Output 8 and connects it to the PC's motherboard. If the PC has a Pentium IV processor, he also unspools and connects the Pentium IV Auxiliary Power Output 10; otherwise, this cable is not used.

The technician can now power the PC normally. To boot the PC, of course, the technician will need to provide power to its hard drive and will do so by unspooling and connecting to the PC's hard drive either the ATX/BTX Standard Peripheral Power Output 12, or the SATA Peripheral Power Output 11, depending on which power connector the component to be tested uses.

The POST/RAM/Video Diagnostics Module 39 is designed to provide complete testing of a PC's Power-On Self-Test (POST) process, processor, motherboard, system memory, and video subsystem; and also to provide surrogate system memory, a surrogate video card, or even a surrogate processor, as needed. It consists of a microprocessor; one or more nonvolatile memory means used to store the test subroutines and a database of error codes and resolutions; a means of communicating with the device's companion personal computer ("PC"), preferably a USB or Ethernet interface, to load new or updated test routines and/or POST error codes into its nonvolatile memory 36; a volatile memory means to be used in the event of faulty volatile memory in the PC under test; a POST/RAM/Video diagnostics cable, designed to fit into a standard PCI expansion slot and to function on the PC's PCI bus 1; and a standard SVGA video output port used for this module's video test subroutines 2. Here, too, it will be obvious to one skilled in the art that this module can be easily redesigned in future to accommodate changes in technology. Indeed, the module will receive updated POST error and resolution information via its communication means 36 as often as needed, and when the PCI standard bus that is the current state of the art becomes obsolete, this module can be easily redesigned with such new technology as will be developed.

When the end user encounters a PC that (1) does not POST, or (2) does not power on even though the power supply tests normal, he will unspool the POST/RAM Diagnostics Cable 1 from the module and connect it to any available PCI slot on the motherboard. First, the module's microprocessor will execute the POST test subroutines stored in the nonvolatile memory means, and conduct the POST test. If there are errors detected in the POST, it will record the POST error code(s) that were returned, and reference them against the database of POST error codes and resolutions stored in its nonvolatile memory means.

It will then display any POST error codes for the user, on the device's LCD screen 4. It will also list there, in non-technical language, the remedy for the POST error codes drawn from the database of resolutions stored in its nonvolatile memory means. Second, the module's microprocessor will load the memory test subroutines stored in the module's nonvolatile memory means, and test the system's memory. If there are any problems detected with the system's RAM, it will display those errors on the LCD screen 4, again in clear, non-technical language. Third, the module's microprocessor will load the video test subroutines from the module's nonvolatile memory means, and execute the video tests. These video tests will display a test pattern on the PC's monitor. The device will display on the LCD screen 4 a question asking the end user whether the test pattern displayed properly, and will receive the user's input via the device's control panel 5.

Because this module has its own microprocessor, volatile memory, and video display subsystem, it has the ability to surrogate any of the above components, if testing should prove them faulty. If the PC's processor is faulty, this module's microprocessor will take over, so that the remaining two tests can be run. Similarly, if the PC's system memory should prove faulty, this module will allow the PC's processor to load the data it needs into the module's own volatile memory means, so that the other tests can proceed. Additionally, this module features an SVGA Video Output Port 2 that can be used when a PC's video card is faulty. When an end user cannot see the test pattern that should be displayed on the test PC's monitor as part of the video subsystem test (as described above), he simply connects the PC's monitor to the SVGA Video Output Port 2. The test pattern will then be displayed again. If the end user can now see the test pattern, he knows the PC's monitor is working normally, and that its video card is defective and needs replacement; if the test pattern does not display, the end user knows this monitor is defective.

The Mass Storage Testing Module 41 is designed allow the user to connect a mass storage device (usually a hard disk drive) to the device in order to (1) test its condition and functionality, (2) identify any errors or problems that may be present in the software stored on the mass storage device being tested, and (3) make it usable on a functioning PC, so that any data stored on the mass storage device being tested can be retrieved. It consists of a microprocessor; a nonvolatile memory means used to store commands and instructions for the microprocessor; a volatile memory means to be used as a data buffer; a series of input ports to which a mass storage device can be connected in order to make it visible and readable to the device's companion PC, namely an IDE standard desktop input port 13, an IDE standard notebook input port 18, and a SATA standard input port 15; a series of input/output ports which can be used either as secondary inputs, or as destination output ports for the devices connected to the input ports as described above, namely an IDE standard desktop input/output port 19, an IDE standard notebook input/output port 14, and a SATA standard input/output port 17; and a mode selector switch that controls the function of the input/output ports 16.

Again, it will be obvious to a person skilled in the art that this module can be redesigned to accommodate changes in technology: As the IDE and SATA standards become obsolete and are replaced by new standards, this module can be easily replaced with new modules designed to test and read from such new mass storage technologies as shall be developed.

After he has conducted the power supply and POST/RAM tests outlined above, the technician still needs to test the PC's mass storage devices, in particular its hard drive, and he may wish to retrieve data stored thereon. To do this, he will connect the hard drive to the device. If the drive in question is an IDE-type drive from a desktop PC, he will connect it to the device using either the IDE Standard Desktop Input Port 13, or the IDE Standard Desktop Input/Output Port 19, and will power it using the ATX/BTX Standard Peripheral Power Output 12 from the Power Supply Test Module. If the drive in question is an IDE-type drive from a notebook PC, he will connect it to the device using either the IDE Standard Notebook Input Port 18, or the IDE Standard Notebook Input/Output Port 14, and will again power it using the ATX/BTX Standard Peripheral Power Output 12 from the Power Supply Test Module.

If the hard drive in question is a SATA-type hard drive (for either a notebook or desktop PC), he will connect it to the device using either the SATA Standard Input Port 15 or the SATA Standard Input/Output Port 17, and power it using the SATA Peripheral Power Output 11 from the Power Supply Test Module. Regardless of how the drive to be tested is connected, the module will then transmit connection data to the device's companion PC via the module's PC Data Link Port 36. The mass storage device being tested will appear normally on the companion PC, where it can be tested, or its data copied.

This module can also be used to clone a hard disk drive. The Mass Storage Test Module Mode Selector Switch 16 controls the function of the three mass storage input/output ports 14, 17, and 19. When this switch is in "Copy" mode, these ports function as inputs; when in "Clone" mode, they function as outputs. To clone a hard disk completely, the technician need only set the module to "Clone" mode and attach it to one of the module's input-only ports 13, 15, or 18. The data will then be copied onto a device attached to any one of the output ports. During the cloning process, the LCD screen 3 will display the task progress, along with any errors that may arise.

The Cable Continuity Testing Module 42 is designed to test the continuity of a variety of cables commonly used in PCs. It consists of a low-capacity power source, preferably either a capacitor charged from the device's main power supply or a standard commercial battery such as a AA; a means of communicating to the end user the results of the continuity testing, preferably a small, simple electro-active speaker that will sound an audible signal when a circuit is completed in a functioning cable; and a series of test ports to which the cables will be connected, as are described below.

To test any cable, the end user need only connect each end of the cable to each test port. It makes no difference which end of the cable is plugged into which test port. If the cable is sound, and functioning to specifications, the audible buzzer will sound; if the cable is faulty, it will not. The module can test the following cables:
1. RJ-11 (standard phone line), by connecting 20 to 21;
2. RJ-45 (standard Ethernet patch cable), by connecting 24 to 25;
3. USB Type-A to USB Type-B, by connecting 22 or 30 to 26;
4. USB Type-B to USB Type-B (USB extension), by connecting 22 to 30;
5. IDE Standard Desktop, by connecting 23 to 26;
6. IEEE-1394, by connecting 28 to 29;
7. SATA, by connecting 31 to 32;
8. SVGA, by connecting 33 to 34.

Once more, it will be obvious to one skilled in the art that this module can be easily adapted to test any combination of cables.

The TechMate incorporates all the hardware diagnostic tools a field service technician needs in one portable device approximately the size of a paperback book. The device interfaces with any standard Windows laptop through a USB port and can even be incorporated into the same chassis with a laptop PC. It includes a power supply tester; PCI bus-based testing for motherboards, processors, system memory, and the POST process; and cable continuity checkers. More importantly, it includes a surrogate power supply and a surrogate video card, so that the technician in the field can still power up a PC with a malfunctioning power supply, or can still get video output from a PC with a malfunctioning video card.

This enables the technician to proceed to further testing, even when these devices do not work. It allows him to test all the relevant hardware of a PC, even when some of that hardware is malfunctioning. Most importantly of all, however, the TechMate provides connectivity for hard disk drives. This allows the field service technician to interface a malfunctioning PC's hard disk with his laptop; once there, he can test the drive, scan for any software errors, scan for viruses and spyware, and retrieve any data his client may need.

In addition to the instant invention possessing the capacity to fully test and run diagnostics on a personal computer, additional modules have been incorporated to allow for equivalent and substantive testing of a laptop's primary systems including power, video and POST/RAM as illustrated and described below.

Furthermore, taking into account the present state of the art, the current embodiment of the device will feature four removable modules 39-42, as shown in FIGS. 1-3. These respective modules include a module for testing a malfunctioning personal computer's power supply 40; a module for personal computer's mass storage devices 41; a module for testing a personal computer's cable continuity 42; and a module for testing a personal computer's 39 POST, RAM, and video. To this original embodiment will now be added three additional removable modules 101, 119, and 141, as shown in FIGS. 5-8. These modules include a module for testing a laptop computer's power supply 119; a module for testing a laptop computer's video system 101; and a module for testing a laptop computer's POST process and RAM 141. Again, only the preferred embodiment is described herein, since as technology changes these modules can be replaced with modules designed to test whatever new technology is developed. Therefore, those skilled in the art may utilize greater or fewer modules than present disclosed depending upon the needs of the technology at the time of operation of the instant invention.

Figure 5:
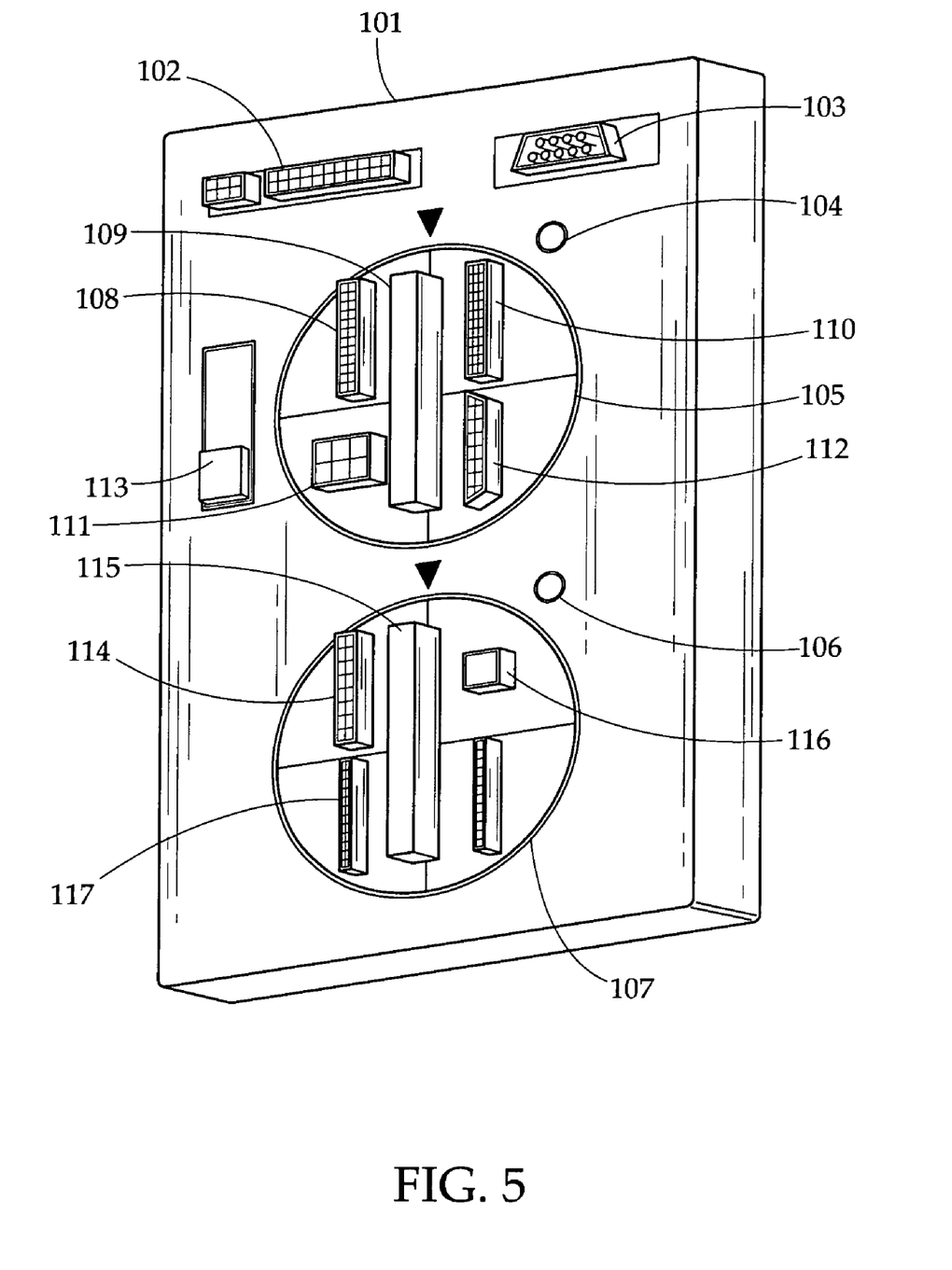
FIG. 5 is an isometric view of the instant invention, further illustrating a video test module for testing a laptop computer's video system.

FIG. 5 illustrates the Laptop Video Test Module 101 is designed to allow complete testing of a laptop computer's video subsystem, including its video controller, integrated video display, and inverter board (if any); and to surrogate the function of any element of the video system, should any prove faulty. It will consist of a microprocessor; one or more video logic controllers suitable to drive any of the various displays in common use in the art; one or more nonvolatile memory means used to store commands and instructions for the microprocessor and video logic controller(s); a video output capable of sending video test patterns to a video display under test, featuring a retractable cable terminating in a receiver designed to accommodate an adapter; a series of adapters suitable to interface the receiver terminating the video output cable with any connector type in common use in the art 108, and 110-112, which adapters are arranged on a selector wheel 105 described more particularly below; a standard SVGA video connector for the video output 103; a standard DVI video connector for the video output 102; a selector switch 113 controlling the destination of the video being output, and capable of directing the output to the SVGA video connector, the DVI video connector, or the assortment of laptop video interface adapters; a video input capable of receiving video from any laptop video controller then in common use in the art, featuring a retractable cable terminating in a receiver designed to accommodate an adapter; a series of adapters suitable to interface the receiver terminating the video input cable with any connector type then in common use in the art 114-118, which adapters are arranged on a selector wheel 107, as described more particularly below.

When a technician encounters a laptop PC that does not display video, he must first determine whether the laptop is delivering video to its integrated video display, and then whether the video display is displaying it properly, since the problem could lie with either or both of these components. To do this, he will first disconnect the laptop's integrated video display from its video controller on the laptop's motherboard, select the appropriate adapter on the tool, and then connect the laptop's display to the tool. The tool will send a video test pattern to the laptop's display. If the video test pattern displays properly, the technician knows the display is functioning; if it does not, the technician knows the display is faulty and needs to be replaced. Next, the technician will test the laptop's video card and video output system. To do this, he will select the appropriate adapter from the adapter wheel, and connect the laptop's video controller to the device. The video controller's normal output can then be displayed on a standard PC video monitor connected either the standard SVGA video output 103 or the standard DVI video output 102. Alternatively, if a known-good reference monitor is not available at the time of testing, the apparatus will verify that raw data is being passed from the video controller, and display confirmation on its internal LCD display.

Figure 6:
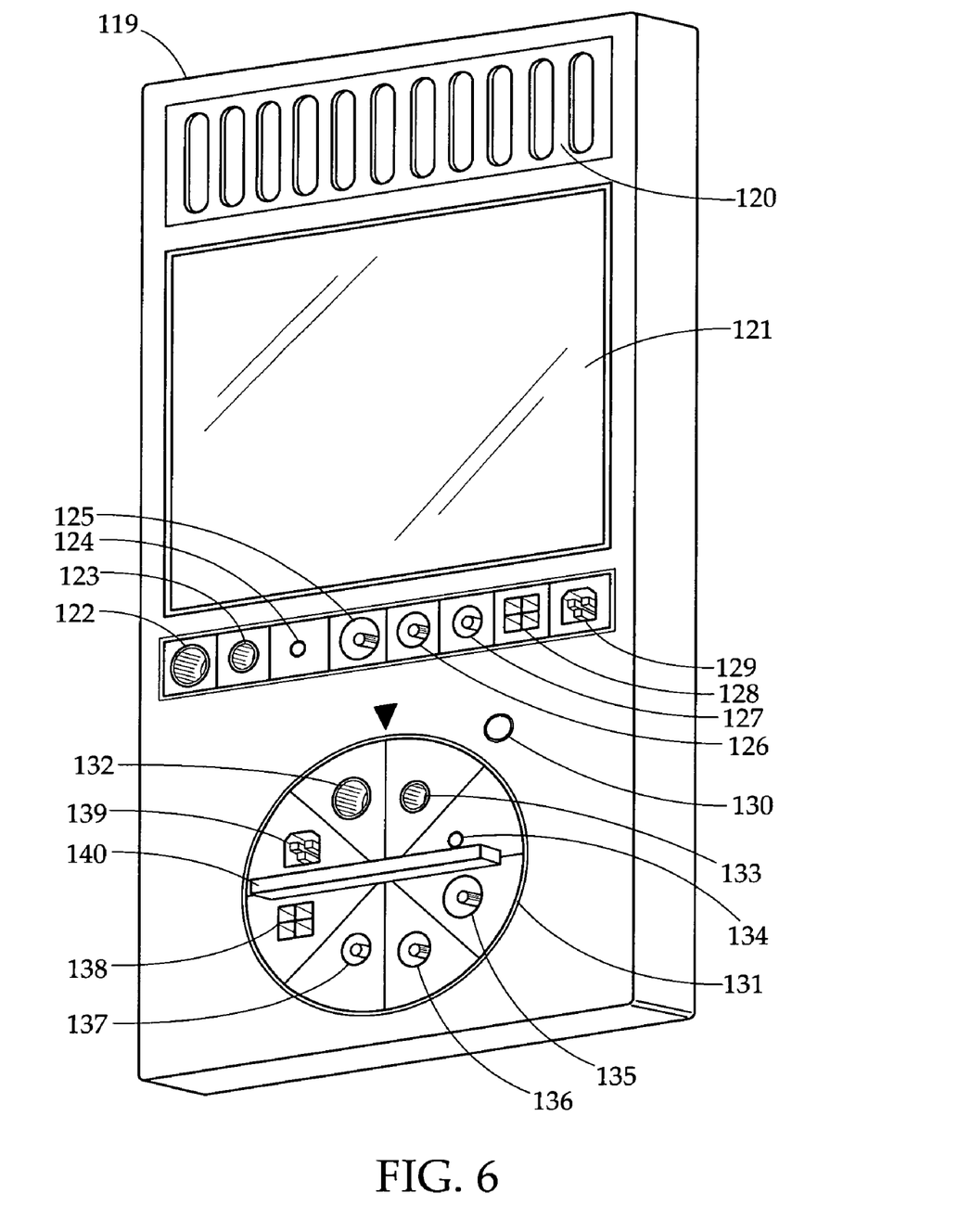
FIG. 6 is an isometric view of the instant invention, further illustrating a power supply module for testing a laptop computer's power supply.

FIG. 6 illustrates The Power Supply Test Module 119 is designed to provide complete testing of a laptop PC's power supply, as well as to provide power to a laptop PC whose power supply has malfunctioned. It will consist of a DC power supply comprising a rectifier and AC to DC converter, which supply is capable of producing electrical power sufficient to enable not only the module's own operation, but to provide power to a malfunctioning laptop PC; an autoranging sensor that allows the module to supply the specific requested power for an individual unit under test, on demand; an LCD screen on which the condition of a power supply under test can be indicated 121; a microprocessor suitable for controlling the LCD screen; one or more nonvolatile memory means suitable for storing commands and operating instructions for the microprocessor and LCD screen subsystem; a series of inputs for the power supply tester suitable to interface any power supply connector type in common use in the art 122-129; a first DC power output with a universal connector; a series of adapters for the first DC power output's universal connector, suitable to interface the DC output with any power supply connector in common use in the art 132-139; a second DC power output with a SATA peripheral power connector, preferably featuring a retractable cable; and a selector wheel for the adapters for use with the first DC power output 131, described more particularly below.

Of course, it will be obvious to one skilled in the art that this module can be redesigned in future to accommodate changes in power supply technology and thus, as the connectors that are the current state of the art become obsolete and are replaced with newer standards, new modules can be easily designed that will allow the device to test and power devices built to those newer standards.

When a technician engages a laptop PC that does not power on, he will begin his diagnostic procedure by testing the PC's power supply. He will connect the laptop's power supply to the appropriate connector on the series of power supply inputs 122-129. The Power Supply Test Module will then attempt to draw power from the supply under test, and will measure its output. The output will be displayed on the LCD screen 121, measured in voltage and amperage. The technician will then compare the actual output of the power supply under test with the optimal output—this information can be found, by FCC rules, printed on the power supply itself (or in the service manual, should the printed badge be missing or illegible). If the power supply proves defective, the technician will then use the Power Supply Test Module to power the laptop for further testing. To do so, he will select the appropriate adapter from the DC output connector selection wheel 131, using this adapter to connect the DC power output to the laptop under test. The Power Supply Test Module, being designed to deliver the required power for any device on demand, will then power the laptop according to its specifications, allowing the technician to proceed to further testing.

Figure 7:
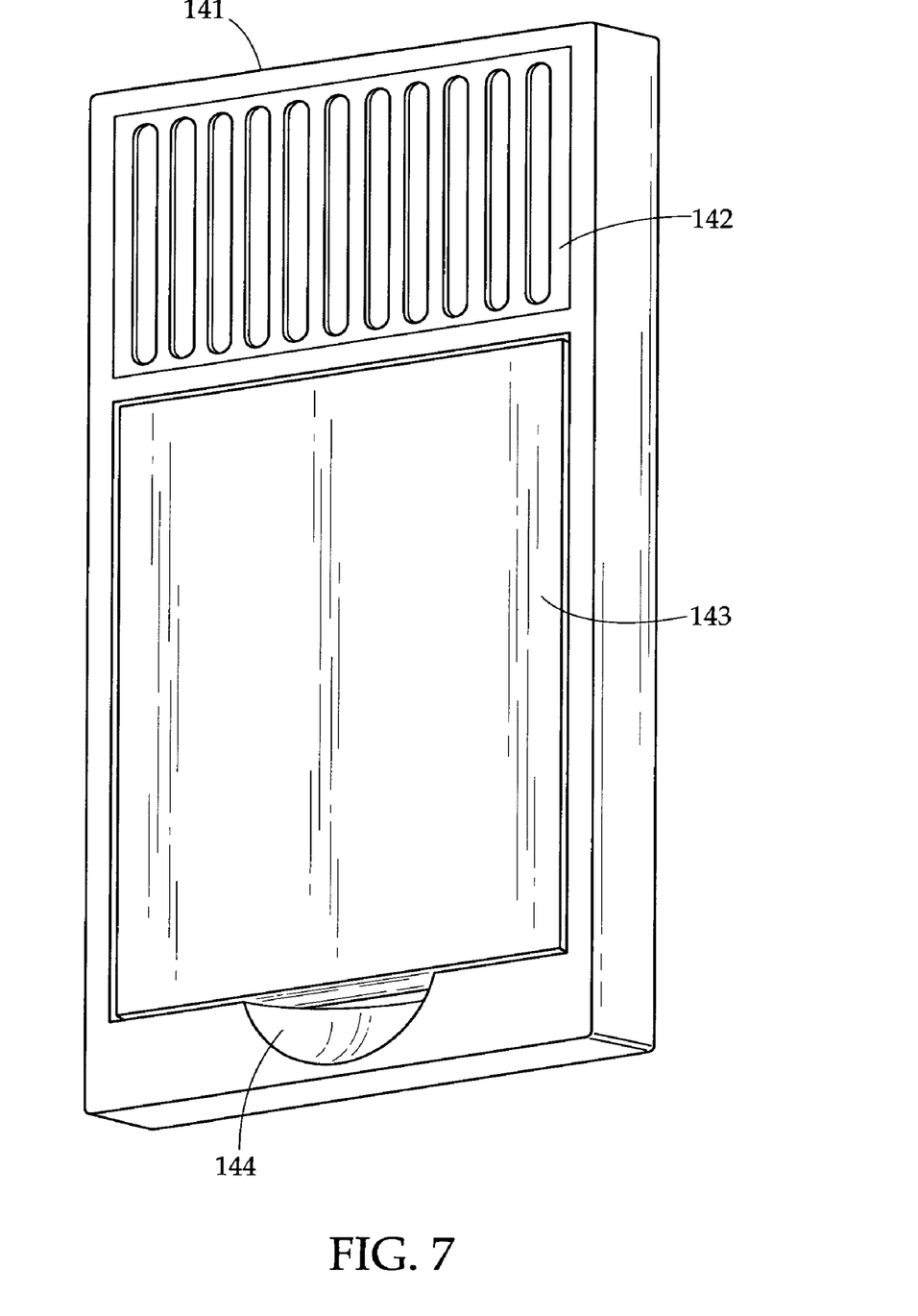
FIG. 7 is an isometric view of the instant invention, further illustrating a POST/RAM test module for testing a laptop computer's POST process and RAM.

FIG. 7 illustrates a The POST/RAM Diagnostics Module 141 is designed to provide complete testing of a PC's Power-On Self-Test (POST) process, processor, motherboard, and system memory; and also to provide surrogate system memory, or even a surrogate processor, as needed. It consists of a microprocessor; one or more nonvolatile memory means used to store the test subroutines and a database of error codes and resolutions; a means of communicating with the device's companion personal computer ("PC"), preferably a USB or Ethernet interface, to load new or updated test routines and/or POST error codes into its nonvolatile memory; a volatile memory means to be used in the event of faulty volatile memory in the PC under test; a POST/RAM Diagnostics Cable, designed to fit into a standard Portable Computer Memory Card Interface Adapter ("PCMCIA" or "PC Card") expansion slot and to function on the PC's PCMCIA bus 143.

Here, too, it will be obvious to one skilled in the art that this module can be easily redesigned in future to accommodate changes in technology. Indeed, the module will receive updated POST error and resolution information via its communication means as often as needed, and when the PCMCIA standard bus that is the current state of the art becomes obsolete, this module can be easily redesigned with such new technology as will inevitably be developed.

When the end user encounters a laptop PC that (1) does not POST, or (2) does not power on even though the power supply tests normal, he will unspool the POST/RAM Diagnostics Cable 143 from the module and connect it to any available PCMCIA slot. First, the module's microprocessor will execute the POST test subroutines stored in the nonvolatile memory means, and conduct the POST test. If there are errors detected in the POST, it will record the POST error code(s) that were returned, and reference them against the database of POST error codes and resolutions stored in its nonvolatile memory means.

It will then display any POST error codes for the user, on the device's LCD screen 4. It will also list there, in non-technical language, the remedy for the POST error codes drawn from the database of resolutions stored in its nonvolatile memory means. Second, the module's microprocessor will load the memory test subroutines stored in the module's nonvolatile memory means, and test the system's memory. If there are any problems detected with the system's RAM, it will display those errors on the LCD screen 4, again in clear, non-technical language.

Because this module has its own microprocessor, volatile memory, and video display subsystem, it has the ability to surrogate any of the above components, if testing should prove them faulty. If the PC's processor is faulty, this module's microprocessor will take over, so that the remaining two tests can be run. Similarly, if the PC's system memory should prove faulty, this module will allow the PC's processor to load the data it needs into the module's own volatile memory means, so that the other tests can proceed.

Figure 8:
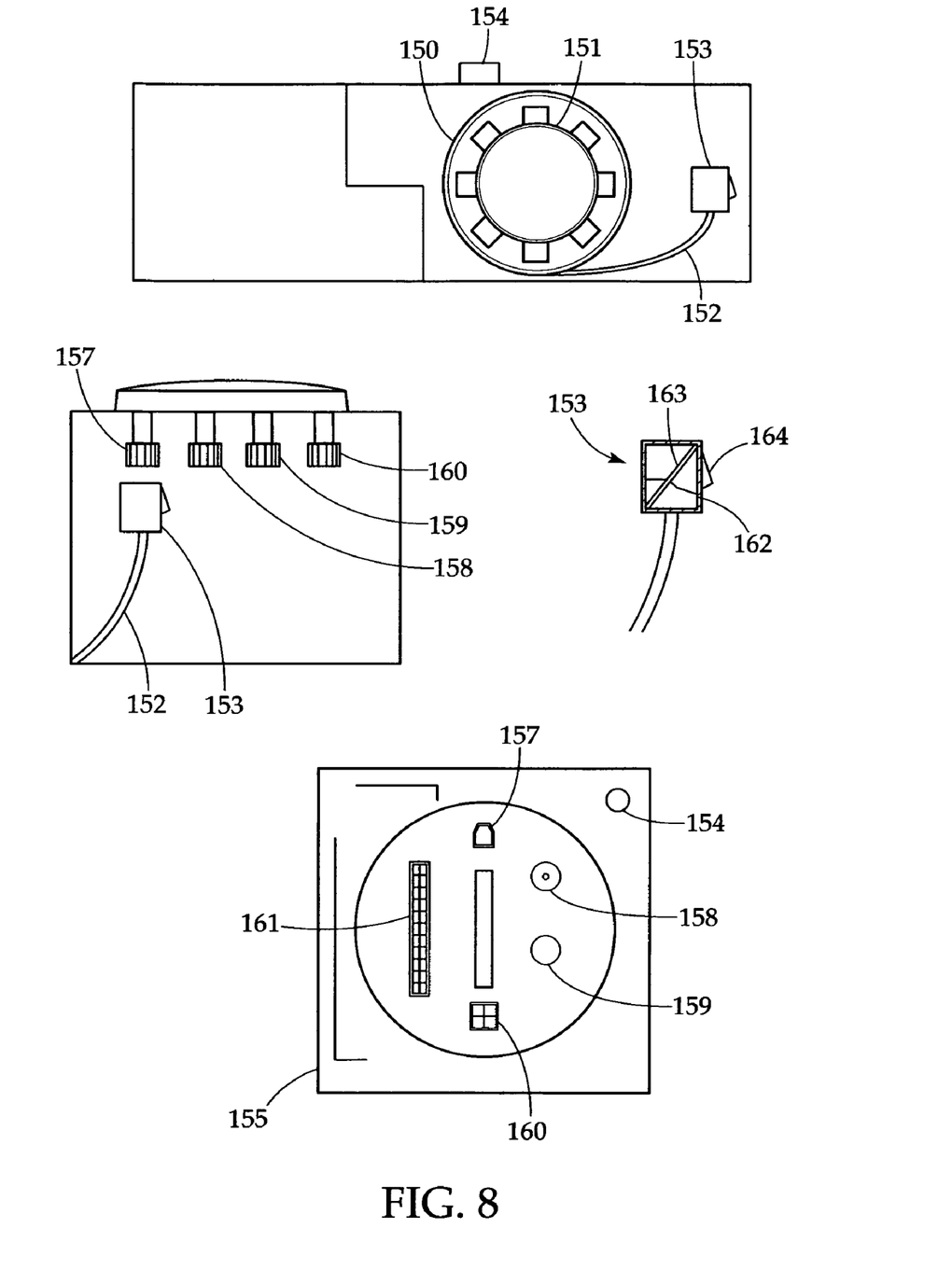
FIG. 8 is an isometric view of the instant invention, further illustrating a selector wheel for use in conjunction with the instant invention.

On each module, all adapters necessary to interface the universal connector with any of the myriad connector types it will encounter are arranged on a selector wheel. This wheel is designed to allow them to be stored safely within the device, so that they will not be lost or damaged in transit.

FIG. 8 displays in its retracted position, a retractable cable 152 spools completely into the module housing. This cable terminates in a universal receiver 153, which, when the cable is in its retracted position, will face up toward the top of the housing. The spool around which the cable is wound 150 features a one-way locking gear 151 that permits the cable to extend while preventing it from retracting. A release positioned on the top of the module 154 disengages the one-way locking gear, when necessary, to permit the cable to retract. The universal receiver is recessed into the housing.

The universal receiver 153 is a female connector 162 designed to accept a male retaining post. This post enters the female connector, and is held in place by a tongue 163 made of suitable material, preferably steel. The tongue is designed to lock the receiver and an adapter together with sufficient strength to permit the operator to extend the retractable cable by gripping the adapter. To that end, the tongue will permit only downward motion of the type that engages the adapter with the receiver, and resists upward motion of the type that disengages adapter and receiver. A release 164 serves to disengage the tongue and permit the separation of receiver and adapter, when necessary.

Positioned over the universal receiver, flush with the top edge of the housing, is a selector wheel 155 that rotates around a central axis and uses a spring 156 to allow it limited vertical motion. A series of adapters 157-161 is arranged along this selector wheel. Each adapter features on one end a male connector designed to fit into the female universal receiver 153, and on the other end a connector suitable to interface with whatever device it will be used to test. The adapter is oriented such that the end designed to interface with the universal receiver faces the receiver. This end of the adapter sits flush with the floor of the selector wheel, and is designed to seal the gap in the selector wheel such that no dust or debris can pass beyond it. The selector wheel is rotated so that the desired adapter is positioned above the universal receiver—the ready position. The operator then presses down on the selector wheel, which lowers the selector wheel vertically, causing the adapter in the ready position to engage with the universal receiver. The operator then grasps the adapter and pulls upward, causing the retracted cable to extend through the gap in the selector wheel, unspooling as it pays out.

Finally, a key feature of the TechMate is its ability to receive upgrades. All of the tools the TechMate incorporates are readily adaptable to any new technology that will arise since each connection originates from a removable plate on the device. Although individual tools to test the various components exist, no tool available today has been successful in integrating these vast functions into one device.

I claim:

1. An apparatus for the diagnosis of the peripherals of both laptop and desktop computers comprising:
   a main control panel;
   a series of modules in electrical communication comprising:
      a module for testing a desktop PC's power supply;
      a module for testing a laptop PC's power supply;
      a module for testing a mass storage device;
      a module for testing cable continuity;
      a module for testing a desktop PC's power on self test function, RAM function, and video function;
      a module for testing a laptop PC's power on self test function and RAM function;
      a module for testing a laptop PC's video function; and
      wherein said module for testing power on self test and RAM function on a laptop PC further comprises a series of components in electrical communication comprising:
      a microprocessor;
      one or more nonvolatile memory means used to store the test subroutines and a database of error codes and resolutions;
      a means of communicating with a companion personal computer to receive updates to test routines and the error code database;
      a volatile memory means; and,
      a power on self test/RAM diagnostics cable.

2. The apparatus for the diagnosis of laptop computer peripherals of claim 1 wherein said power on self test/RAM diagnostics cable is designed to interface with said laptop PC under test via its PCMCIA bus and to unspool from said apparatus via a retractable cable.

3. The apparatus for diagnosis of laptop computer peripherals of claim 1 wherein said microprocessor and said volatile memory means are used as surrogates for a set of components on said laptop PC under test when said set of components on said laptop PC malfunction.

4. The apparatus for the diagnosis of laptop computer peripherals of claim 1 wherein said module for testing power on self test and RAM function reports errors to an end user in non-technical language.

5. The apparatus for the diagnosis of laptop computer peripherals of claim 1 wherein said module for testing power on self test and RAM function advises an end user of the appropriate resolution for any errors discovered by said apparatus.

6. The apparatus for the diagnosis of laptop computer peripherals of claim 1 wherein the said module for testing power on self test and RAM function is upgradeable to accommodate new technologies.

7. An apparatus for the diagnosis of the peripherals of both laptop and desktop computers comprising:
   a main control panel;
   a series of modules in electrical communication comprising:
      a module for testing a desktop PC's power supply;
      a module for testing a laptop PC's power supply;
      a module for testing a mass storage device;
      a module for testing cable continuity;
      a module for testing a desktop PC's power on self test function, RAM function, and video function;
      a module for testing a laptop PC's power on self test function and RAM function;
      a module for testing a laptop PC's video function; and
      wherein said module for testing a laptop PC's video function further comprises a series of components in electrical communication comprising:
      a microprocessor to act as a video controller;
      one or more nonvolatile memory means used to store the test subroutines;
      a means of video output;
      a diagnostic cable for said video output; one or more fixed ports for said video output;
      a series of adapters for said means of video output;
      a means of video input;
      a diagnostic cable for said video input; and
      a series of adapters for said video input.

8. The apparatus for the diagnosis of laptop computer peripherals of claim 7 wherein said video controller are used as surrogates for a set of components on said laptop PC under test when said set of components on said laptop PC malfunction.

9. The apparatus for the diagnosis of laptop computer peripherals of claim 7 wherein the said module for laptop video function is upgradeable to accommodate new technologies, as these develop.

10. A method for conducting testing of a laptop PC utilizing an apparatus for the diagnosis of the peripherals of both laptop and desktop computers comprising:
   a main control panel;
   a series of modules in electrical communication comprising:
      a module for testing a desktop PC's power supply;
      a module for testing a laptop PC's power supply;
      a module for testing a mass storage device;
      a module for testing cable continuity;
      a module for testing a desktop PC's power on self test function, RAM function, and video function;

a module for testing a laptop PC's power on self test function and RAM function; and a module for testing a laptop PC's video function;

comprising the steps of:

(a) determining whether the PC turns on, wherein when the PC turns on proceeding to step c, wherein when the PC does not turn on measuring the power supply of the PC using a power supply tester;

(b) using a second functional power supplier to supply power to the PC and turning the PC on;

(c) using a power on self test/RAM diagnostics card on the PCMCIA bus of the laptop PC to test the motherboard, processor, and RAM of the PC, wherein when the power on self test diagnostics card does not find a defect proceeding to step e, further wherein when the power on self test diagnostics find a defect the card generates a code;

(d) using means for obtaining definition of the code generated by the power on self test/RAM diagnostics card;

(e) using the power on self test/RAM diagnostics card on the PCMCIA bus of the laptop PC to test the memory of the PC;

(f) wherein when a defect is found in the motherboard or processor of the PC by step c or a defect is found in the memory of the PC by step e then removing the hard drive of the PC;

(g) making the hard drive readable on a second functional PC and testing the hard drive for software errors.

* * * * *